United States Patent Office 3,019,372
Patented Jan. 30, 1962

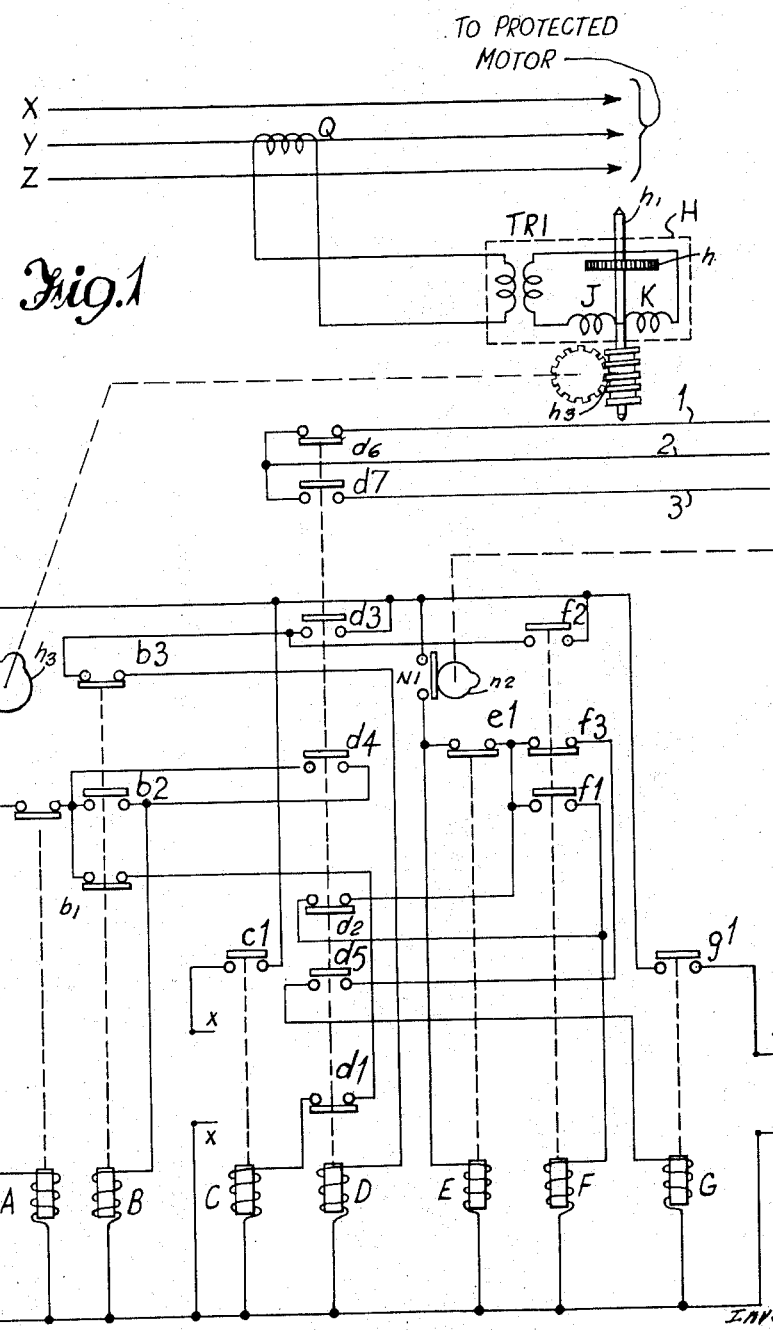

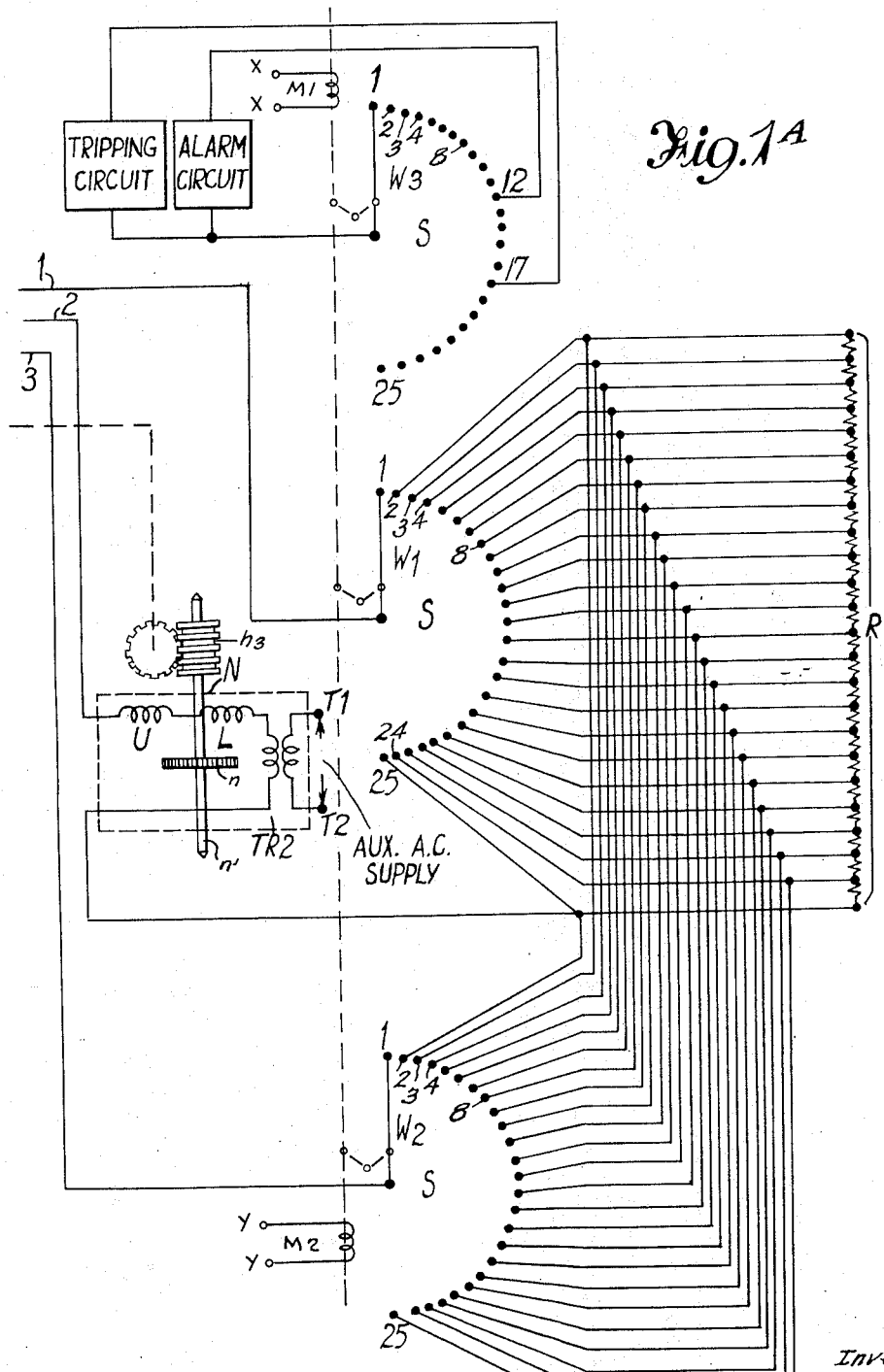

3,019,372
OVERHEAT ELECTRICAL PROTECTION DEVICE
Frederick Melville Pearce, Hale, and James Wilson Hodgkiss, Sale, England, assignors to Metropolitan-Vickers Electrical Company Limited, London, England, a British company
Filed Jan. 9, 1956, Ser. No. 558,156
Claims priority, application Great Britain Jan. 12, 1955
6 Claims. (Cl. 317—13)

This invention relates to a device for the protection of electrical equipment from damage due to overloading or unbalanced loading, and is particularly concerned with a device of the kind having characteristics similar to the thermal characteristics of the equipment to be protected.

It is a primary obect of the present invention to provide a device which is capable of controlling the working temperature of a piece of electrical equipment.

A disadvantage of known heat control devices is that they rarely can be made to accurately simulate the heat conditions of the equipment to be controlled. It is therefore, another object of this invention to provide a device which will accurately simulate these conditions.

In accordance with a form of the invention there is provided a device operable by the input current to a piece of electrical equipment to produce one or more pulses per unit of time proportional to that part of the input current lost as heat; a second device similar to the first mentioned device and operable from a source of current supply separate from that of the equipment, the pulses producible by this second device being proportional per unit of time to that part of the heat produced in said equipment which is dissipated by cooling, and an equipment or load tripping-contacts-operating-device, operable in accordance with the algebraic sum of the pulses from the first and second devices to disconnect the equipment from its supply or load.

A current measuring unit of the induction meter type fitted with contacts and having a rotatable disc for operating the contacts is preferably used for the first and second devices for producing pulses and a movable electro-magnetically operated switch for the third device.

One of the units is connected in the supply line to the equipment to be protected by means of a suitable transformer and arranged to have a disc speed proportional to the square of the input current to the equipment. The pulses from the first device are passed through an auxiliary pulse control circuit, opreable from a D.C. supply and thence to an operating coil of the switch to move it towards tripuping contacts, provided thereon. The second unit is supplied from a source of current auxiliary to that supplying the equipment to be protected and connected to a resistor whose value is controlled by the third means hereinbefore described in a manner which is related to any rise in the temperature of the equipment above the ambient temperature. The heat content of the equipment at any time, as compared with the initial or ambient state will therefore determine the pulse frequency of the second pulse unit by variation of the resistance of the resistor. The pulses from the second unit are arranged to operate the switch in a direction opposite to that caused by the first unit so that the position of the switch at any time is a measure of the difference between the heat produced and the heat lost.

The proportion of the input current which will be needed to enable the first unit to produce pulses proportional to the heat produced need not be determined directly. Calibration of the unit can be effected by a suitable null method.

If for example a piece of electrical equipment to be protected has been running on load for some time and has therefore reached a steady thermal state, then the heat produced by full load current equals heat lost by cooling. If a pulse rate is arbitrarily assigned to the first unit when the full load condition obtains and if the excess of temperature of the equipment over ambient temperature be represented by an arbitrary displacement of the switch, then this displacement of the switch must control the pulse frequency of the second unit to the same value as was assigned to the first unit in order that a state of balance may be maintained in the protecting device corresponding to the state of balance of the equipment. Provided that the two units operate according to appropriate laws for other values of the various parameters (e.g. speed of rotation of disc of first unit is proportional to the square of the input current and speed of rotation of disc of second unit is proportional to switch displacement), then the protecting device can be made to follow the thermal state of the equipment without knowledge of the absolute values of heat lost per unit of current or temperature rise on load. If the ambient temperature can be expected to vary appreciably during operation of the equipment being protected thermally responsive means may conveniently be employed so as to vary the operating current of the aforesaid second device in accordance with variations in ambient temperature but if the ambient temperature remains constant or substantially constant then the thermally responsive means may be dispensed with so that the operating current of said second device varies solely in dependence upon the effective resistance of the aforesaid resistor connected in circuit by the electro-magnetic switch.

Other objects and advantages will appear more clearly from the following description of an exemplary embodiment of the invention when taken in conjunction with the accompanying diagrammatic drawings in which FIGURES 1 and 1A with the corresponding leads 1, 2 and 3 thereof lined up together show a device according to the invention for protecting an A.C. electric motor against damage due to overloading. The embodiment now to be described is intended for use where the ambient temperature during operation of the A.C. motor being protected remains constant or substantially constant. Consequently it is not necessary to provide thermally responsive means for varying the current in the aforesaid second device to compensate for variations in ambient temperature.

In the drawings conductors X, Y and Z represent supply leads that extend to the electric motor to be protected.

A first conventional induction meter device having a rotatable disc is indicated generally at H and comprises a pair of energizing coils J and K connected in series in the secondary circuit of an input transformer TRI. The primary winding of transformer TRI is arranged across a coil Q inductively coupled to the supply lead Y. The device H is also provided with an impulsing contact H1 operable by the rotation of rotatable disc $h$ of meter H. As shown in FIGURE 1, disc h is fixed on a suitably journalled spindle $h_1$ which is operably connected to a switch actuating cam $h_2$ for contact $H_1$ by means of conventional geared means $h_3$.

A further conventional induction meter device similar to that shown at H is indicated generally at N. It comprises impulsing contact N1 operable by the rotation of rotating disc $n$ of the device, and two energizing coils represented by L and U arranged in the output circuit of an input transformer TR2 having its primary winding connected to terminals T1 and T2 of an auxiliary alternating current supply. As shown in FIGURES 1 and 1A, disc $n$ is fixed on a suitably journalled spindle $n_1$ which is operatively connected to a switch actuating cam $n_2$ for contact $N_1$ by means of conventional geared means $n_3$.

The output circuit of transformer TR2, which is normally disconnected, may be closed through the wipers and bank contacts of an electro-mechanical rotary switch S of the step-by-step type that can be stepped in two directions. As may be observed from the drawings the switch is provided with three contact banks of 25 contacts each and the contacts thereof are engageable by non-bridging wipers W1, W2 and W3 respectively. The switch may be operated in well-known manner to step the wipers from one bank contact to another by delivering D.C. impulses alternatively to separate stepping magnets, the energizing coils of which are indicated at M1 and M2. In the present example the wipers may be stepped clockwise or counterclockwise, as viewed in FIGURE 1A of the drawings, by feeding pulses to the stepping magnet energizing coils M1 and M2 respectively.

The pulse control circuits for the coils M1 and M2 include the impulsing contacts H1 and N1 together with a number of light current telephone-type relays designated A, B, C, D, E, F and G and contacts relating thereto, the relays A and E being of the kind that are slow-to-operate. Coils M1 and M2 have their terminals connected to their associated pulse control circuits at X—X and Y—Y respectively (FIGURE 1). The circuits are arranged to be supplied with direct current from an auxiliary D.C. supply.

Between bank contacts 2 and 25 of that contact bank pertaining to wiper W1 is connected a resistor R, with contacts 3 to 24 inclusive being connected to different tapping points along that resistor and contacts 2 to 24 inclusive being commoned respectively to bank contacts 3 to 25 inclusive of that contact bank associated with wiper W2. Contact 25 of the former bank is directly connected to contact 2 of the latter and to the secondary winding of transformer TR2. Wiper W1 is connected to coil U of device N over break contact $d6$ of relay D while wiper W2 is alternatively connectable to coil U over make contact $d7$ consequent on the operation of relay D.

When the motor to be protected is started into operation the disc of the induction meter device H is set in rotation due to the passage of energizing current through the energizing coils J and K. Impulsing contact H1 commences to alternately open and close responsively to and at a rate determined by the speed of rotation of the disc, which in turn is proportional to the heat produced in the motor.

When impulsing contact H1 closes for the first time it establishes a circuit for the operation of relay A which is slow-to-operate as aforesaid. During the operating lag of this relay an operating circuit is provided for relay C over the contacts $a1$, $b1$ and $d1$. Contact $c1$ in closing delivers a D.C. impulse to the stepping magnet energizing coil M1 of switch S, in consequence of which, the wipers W1, W2 and W3 are stepped from bank contacts 1 to bank contacts 2. The operation of relay A then takes place to disconnect at contact $a1$ the circuit over which relay C is operated, shortly followed by the opening of contact H1.

With the wiper W1 engaging bank contact 2 the output circuit of transformer TR2 is closed through entire resistor R, whereupon the disc of the induction meter device N is set in rotation as a result of the current circulating through the energizing coils L and U. In response to rotation of the disc the impulsing contact commences to alternately open and close at a rate determined by the speed of rotation of the disc. The speed of rotation of the disc is determined by the current flowing in the energizing coils L and U which in turn depends upon the resistance connected in circuit with said coils by the wiper W1 and the magnitude of the auxiliary alternating current supply, the effective resistance of the resistor R being varied as will hereinafter be described during operation of the motor being protected and the magnitude of the auxiliary alternating current supply being of predetermined magnitude such that the disc speed is proportional to that part of the heat produced in the motor which is dissipated by cooling. In view of the fact that the heat dissipated will be of a low order during the starting or initial operating period of the motor the speed of the rotatable disc must likewise be of a low order and to this end the resistor R is introduced in its entirety into the energizing circuit of the device N.

The disc of the induction meter device H on the other hand will be rotating at a relatively high speed compared with that of device N during the starting or initial operating period of the motor, with the result that, impulsing contact H1 will close several times before contact N1 closes for the first time.

For the sake of example let it be assumed that contact H1 closes three times prior to the initial closure of contact N1. In this event two further impulses will be delivered to the energizing coil M1 to re-operate the switch S to step the wipers from bank contacts 2 over contacts 3 to contacts 4, by repetitions of the sequence of relay operations previously described. As a result two tapped portions of the resistors R will be disconnected from the load circuit of transformer TR2 to bring about an increase in the disc speed of device N.

In the example taken contact N1 will close prior to the fourth closure of contact H1 and gives rise to the following sequence of operations. Relay F operates, prior to the operation of slow-to-operate relay E, over contacts N1, $e1$ and $d2$ and locks up independently of contact $d2$ over its own contact $f1$. An operating circuit for relay D is closed at contact $f2$; contact $f3$ in opening guards against the premature operation of relay G consequent on the operation of relay D. When relay D operates it locks over contact $d3$ and contacts $d4$ and $d5$ prepare circuits for the operation of relays B and G respectively. By reason of the closure of contact $d7$ and the opening of contact $d6$ one of the tapped portions of resistor R previously disconnected from the load circuit of transformer TR2 is re-inserted through wiper W2 to reduce the disc speed of device N. Relay E then operates to disconnect at contact $e1$ the circuit over which relay F is operated and after a short time delay impulsing contact N1 re-opens. Relay D, however, is maintained operated over its locking contact $d3$.

From a consideration of the pulse control circuits it will be apparent that if contact H1 now closes relay D will be released at contact $b3$ when relay B operates over contacts H1, $a1$ and $d4$, and both those previously mentioned tapped portions of resistor R disconnected from the load circuit at contacts $d6$ and $d7$ restore to normal. It will also be evident that following the initial closure of contact N1 at least two successive closures of contact H1 will be required to operate relay C to cause the switch to re-operate. Moreover, relay G in the pulse control circuits is inoperative to cause the wipers to step back one contact in the counter-clockwise direction until contact N1 closes at least twice directly following a closure of contact H1. In this event relay D will be operated consequent on the first of the two successive closures of contact N1. Upon the second successive closure of contact N1, however, relay G will operate over contacts N1, $e1$, $f3$ and $d5$. At contact $g1$ a D.C. impulse is delivered to the energizing coil M2 of switch S and the wipers W1, W2 and W3 will step back one contact in the counter-clockwise direction. It will be observed that relay D remains operated when contact N1 re-opens following the operation of relay E. The effect of stepping the switch in the counter-clockwise direction is virtually the same as that produced when relay D operates, namely, a tapped portion of the resistor is re-introduced into the output circuit of transformer TR2 to slow down the disc of device N.

The disc speed of device N will, of course, vary with variation of the effective resistance of the resistor R, more especially during the starting or initial operating period of the motor being protected. However, with the motor operating under normal steady load conditions a state of thermal equilibrium will obtain in the motor, that is to say, the heat produced by the input current will equal the heat dissipated by cooling. Consequently the disc speeds of the two induction meter devices H and N will be substantially the same and the switch S will remain inoperative, with its wipers on contacts 8 say.

In the event that the motor is overloaded the disc speed of device H will exceed that of device N and the wipers of the switch S will be stepped onwards in the clockwise direction from contacts 8.

When wiper W3 engaged contact 12 an "Alarm Circuit" is established and an indication either audible or visual will be given of the overload condition. Should overloading of the motor persist the wipers will be stepped on to contacts 17 whereupon a "Tripping Circuit" effective to disconnect the supply to or the load from the motor is closed through wiper W3 and contact 17 engaged thereby.

What we claim is:

1. An overheat electrical protection device including a first induction meter type measuring unit fitted with contacts which are operable by a rotatable disc for producing impulses at a rate proportional to the input energy lost as heat from a piece of electrical equipment, a second induction meter type measuring unit, fitted with contacts which are operable by a rotatable disc for producing impulses at a rate proportional to that part of the heat produced in the equipment which is dissipated by cooling and an electromagnetic switch operable in accordance with the difference between the repetition rates of the pulses from the first and second measuring units to disconnect the equipment from its load or supply when this difference reaches a predetermined value.

2. An overheat electrical protection device including a first induction meter type measuring unit fitted with contacts which are operable by a rotatable disc for producing impulses at a rate proportional to the heat produced in a piece of electrical equipment, a second induction meter type measuring unit, fitted with contacts which are operable by a rotatable disc for producing pulses at a rate proportional to that part of the heat produced in the equipment which is dissipated by cooling and an electromagnetic switch operable in accordance with the difference between the heat produced and the heat dissipated in the equipment to disconnect the equipment from a source of current supply or to remove the load therefrom on this difference exceeding a predetermined value, and one of the units being designed to have a disc speed proportional to the square of the input current to the equipment and an auxiliary pulse control unit operable from a D.C. supply for receiving the pulses from the first device and for passing the pulses to an operating coil of the switch to move parts thereof towards tripping contacts and the other unit is supplied from a source of current auxiliary to that supplying the equipment and connected to a resistor whose value is controllable by the switch in a manner related to any rise in the temperature of the equipment above the ambient temperature, the position of the switch contacts at any time being a measure of the difference between the heat produced and the heat lost in the equipment.

3. An overload electrical protection device for electrically powered apparatus comprising first and second electrical metering means for producing electrical impulses, the repetition rate of said pulses varying with the electrical quantity metered by said metering means, first circuit means for connecting said first metering means to said apparatus, a plurality of electrical resistors connected together in series and having taps between adjacent ones of said resistors, switching means having a plurality of contacts connected to different ones of said taps and wiper arm movable from one contact to an adjacent contact in either direction, second circuit means for connecting said second metering means to meter an electrical quantity varied by the selected ones of said plurality of resistors determined by the position of said wiper arm, means for connecting the electrical impulses from said first metering means to advance the wiper arm in a first direction, means for connecting the electrical impulses from said second metering means to advance the wiper arm in the opposite direction, and means responsive to the position of said wiper arm for indicating an overload condition on said apparatus.

4. An overload electrical protection device for electrically powered apparatus comprising first and second electrical metering means for producing electrical impulses, the number of said impulses per unit of time varying with the electrical quantity metered by said metering means, stepper switch means having a wiper arm adapted to engage a plurality of contacts associated therewith and coil means for driving said wiper arm in either direction, a plurality of resistors connected in series with terminals between adjacent ones of said resistors connected to different ones of said contacts, first circuit means connecting said selected ones of said plurality of resistors to be energized through said wiper arm and contacts, second circuit means for connecting said second metering means to meter an electrical quantity varied by the selected ones of said plurality of resistors determined by the position of said wiper arm, third circuit means for connecting the first metering means to said apparatus, means including delay relays for connecting the electrical impulses from said first and second circuit means to said coil means for controlling movement of said wiper arm, and means controlled by the position of said wiper arm for indicating an overload condition on said apparatus.

5. An overheat electrical protection system for protecting electrical apparatus arranged to be operated from a source of current supply, said electrical protection system comprising a first means arranged to be continuously operating throughout the normal operation of said electrical apparatus for producing intermittent impulses at a first rate proportional to the heat produced in said electrically powered apparatus, a second means arranged to be continuously operating simultaneously with said first means and separate therefrom for producing intermittent impulses at a second rate proportional to that part of the heat produced which is dissipated by cooling, and a third means connected with said first and second means and operable in accordance with the difference between said first and second rates of impulsing to disconnect said apparatus from the source of current supply when said difference reaches a predetermined magnitude.

6. An overheat electrical protection system for protecting an electrical apparatus arranged to be operated from a source of current supply, said electrical protection system comprising means including a first device continuously operated by the input current said electrical apparatus for producing throughout the normal operation of said equipment intermittent electrical impulses at a rate proportional to the input energy lost as heat, means including a second device similar to said first device and simultaneously continuously operated from a source of current supply separate from that for said apparatus, said second device producing intermittent electrical impulses at a rate proportional to the difference between the temperature of said apparatus and the ambient temperature, and means including a third device having load tripping contacts operable in accordance with the difference between the repetition rates of the impulses from the first and second devices to disconnect said equipment from its load or supply.

References Cited in the file of this patent
UNITED STATES PATENTS

| | | |
|---|---|---|
| 2,571,013 | Cobean et al. | Oct. 9, 1951 |
| 2,579,255 | Graves | Dec. 18, 1951 |
| 2,740,929 | Baude | Apr. 3, 1956 |